United States Patent

Alessi et al.

[11] Patent Number: 5,658,437
[45] Date of Patent: Aug. 19, 1997

[54] REDUCTION OF THE COD OF AN AQUEOUS STREAM CONTAINING HYDROPEROXIDES AND OTHER ORGANIC IMPURITIES

[75] Inventors: Vanni Alessi, Roncoferraro; Alessandro Franzoni, Travenzuolo; Vittorio Milanesi, Bologna; Renzo Penzo, Mantova, all of Italy

[73] Assignee: Enichem S.p.A., Milan, Italy

[21] Appl. No.: 577,183

[22] Filed: Dec. 22, 1995

[30] Foreign Application Priority Data

Jan. 23, 1995 [IT] Italy .................. MI95A0104

[51] Int. Cl.[6] ........................................ B01D 3/00
[52] U.S. Cl. .................. 203/99; 203/86; 203/91; 203/14; 202/267.1; 568/576
[58] Field of Search ............... 203/14, 99, 91, 203/86; 202/267.1; 568/576, 803, 798, 754, 385

[56] References Cited

U.S. PATENT DOCUMENTS

| 3,351,635 | 11/1967 | Wallington | `549/529 |
| 4,087,455 | 5/1978 | Prescher et al. | 203/14 |
| 5,205,906 | 4/1993 | Grutsch et al. | 203/14 |

FOREIGN PATENT DOCUMENTS

| A-0 529 722 | 3/1993 | European Pat. Off. . |
| A-2306944 | 5/1976 | France . |

*Primary Examiner*—Virginia Manoharan
*Attorney, Agent, or Firm*—Oblon, Spivak, McClelland, Maier & Neustadt, P.C.

[57] ABSTRACT

A process for reducing the COD of an aqueous stream containing methylhydroperoxide, cumylhydroperoxide and other organic impurities characterized in that the reduction of COD is obtained by eliminating the peroxides from the aqueous stream by column distillation.

11 Claims, No Drawings

REDUCTION OF THE COD OF AN AQUEOUS STREAM CONTAINING HYDROPEROXIDES AND OTHER ORGANIC IMPURITIES

The present invention relates to a process for the reduction of the COD of an aqueous stream containing hydroperoxides and other organic impurities.

More specifically, it relates to a process for the reduction of the COD of an aqueous stream containing methylhydroperoxide and cumylhydroperoxide, deriving from the process for the production of phenol from cumene.

Phenol is industrially prepared by the oxidation of cumene and subsequent acid hydrolysis of the resulting cumene hydroperoxide. The reaction mixture obtained consists of phenol, acetone and non-reacted cumene. In addition to the main products, various quantities of by-products are formed, for example, mesityl oxide, α-methylstyrene, p-cumylphenol, phenylmethylcarbinol, acetonphenone and phenols with a high molecular weight.

An aqueous stream containing, in reduced quantities, methylhydroperoxide, cumylhydroperoxide, cumene, phenol, alphamethylstyrene and the salts of organic acids, is flushed from the oxidation section of cumene to cumylhydroperoxide.

This stream has, in general, very high COD values, which are such that it is not possible for it to be directly disposed of in public water.

The flushed material must therefore be sent to the biological plant where, however, it causes a considerable increase in the quantity of mud produced. More-over, some of the peroxides contained in the aqueous stream can be harmful for the activity of the mud itself.

The flushed material can alternatively be disposed of by combustion but this solution, owing to the large volume to be treated, involves high energy consumption.

The Applicant has now found a method which enables, with a modest investment, the peroxides contained in this flushed material to be almost completely eliminated, thus significantly reducing the COD.

In its widest aspect, the invention relates to a process for the reduction of the COD of an aqueous stream containing peroxides and other organic impurities characterized in that the reduction of the COD is obtained by eliminating the peroxides from the aqueous stream by column distillation.

Distillation processes involving aqueous solutions containing methylhydroperoxide and cumylhydroperoxide are not described in literature.

On the other hand Egerton et.al. (Discuss. Faraday Soc., 10, 1951, 278–281) and Gray (Soc. 1952, 3150–3152) indicate the boiling point of methylhydroperoxide at atmospheric pressure as being equal to 86° and 88°–89° C. respectively. This therefore confirms the feasibility of the separation of methylhydroperoxide from water by distillation.

As far as cumylhydroperoxide is concerned, Sergeew and Krushalow (Chim.Promysl. 1957, 201–204) indicate the following boiling points at various vapor pressures: $Tb_{15.5}=116.5°$ C., $Tb_8=100.5°$ C., $Tb_7=97.5°$ C., $Tb_3=88°$ C., $Tb_1=74°$ C. Bassey et al. (Soc., 1955, 2471–2473) indicate $Tb_{0.4}=70°$ C., whereas Kharasch et al. (I.Org. Chem., 16, 1951, 113–125) indicate $Tb_{0.1}=60°$ C. From these data it can be assumed that the boiling point of cumylhydroperoxide, at atmospheric pressure, is undoubtedly higher than 200° C. It is therefore surprising that cumylhydroperoxide can be almost completely separated from water, by distillation at atmospheric pressure, as found by the Applicant. Experimental evidence leads to the assumption that a water-cumylhydroperoxide-methylhydroperoxide azeotrope is established, of which however there are no indications in literature.

The advantage of the invention lies in the fact that it makes it possible, with very reduced energy consumption, to completely eliminate the peroxides present in the stream thus allowing process water almost entirely without these impurities to be obtained or, however, with a COD value which is much lower than the value of the water fed to the column, which can be directly disposed of in public water.

In practice, the peroxides are removed from the top of the distillation column where they are present in a stream with a very limited flow rate and at an extremely high concentration whereas the process water with a COD value which is much lower than the value of water fed to the column is discharged at the bottom.

The stream containing peroxides can be used in reactions which require their presence as initiators, or can be sent for combustion, possibly diluted in fuel oil, or as such or after decomposition to products which are thermally more stable.

In particular the distillation of the aqueous stream containing peroxides is carried out using the following procedure:

the feeding to the column consists of an aqueous stream containing methylhydroperoxide and cumylhydroperoxide in a total concentration of less than 2% w/w, typically between 0.5 and 1% w/w, and in a smaller concentration other impurities such as phenol, cumene, alphamethylstyrene and the salts of organic acids;

the distillation is carried out in continuous, and the stream removed from the head is between 1 and 6% w/w, preferably between 1 and 2% w/w, of the feeding;

the stream removed from the head contains from 10 to 50% w/w of total peroxides, typically from 30 to 40% w/w;

the operating pressure is less than or equal to 760 mmHg.

With respect to the safety of this distillation operation, involving streams with a high peroxide content, and consequently potentially dangerous, the Applicant has been able to establish, after thermal decomposition tests of solutions containing from 36 to 45% w/w of total peroxides, obtained by distilling samples of water containing methylhydroperoxide and cumylhydroperoxide, that:

the decomposition rate of the peroxides is catalyzed by metals. Operating with steel equipment, the decomposition rate therefore also depends on the surface/volume ratio of the equipment being used;

operating with glass equipment, under similar conditions therefore to those with steel equipment with very low surface/volume ratios, extremely low decomposition rates are obtained.

As regards the distillation column for carrying out the separation proposed herein, it is reasonable to assume that the parts which are mostly able to exert a catalytic action are the upper section and the equipment at the top for withdrawal and reflux, as it is in these areas that there is a high concentration of peroxides.

It is technically possible to exclude contact of the aqueous streams with the metallic surfaces, by internally lining the column and subsidiary equipment with non-metallic materials.

In this way, once the problems deriving from the catalytic effect of the metallic surfaces have been eliminated, the possible decomposition of the peroxides in the column would be due only to effects of a thermal type, analogously to what has been experimentally observed in laboratory tests in glass.

These tests have shown that at 100° C., a temperature which is very close to that of the vapors at the top when, at atmospheric pressure, a distillate is obtained containing about 40% w/w of peroxides, the decomposition of these compounds is negligible, as it is limited, for a contact time of 30 minutes, to maximum values of 1 or 2% w/w.

We believe however that it is also possible to carry out the distillation with a normal steel column not lined internally.

In fact the decomposition tests carried out in contact with steel surfaces, at a surface/volume ratio certainly higher than that present in the distillation column, enabled us to estimate that, at a temperature of 100° C., the decomposition of the peroxides would in any case be limited as a maximum decomposition of about 5% w/w was obtained for a contact time of 30 minutes.

In addition, adiabatic calorimetry tests carried out on solutions containing about 40% w/w of peroxides, allowed us to obtain the decomposition $\Delta H$ for these compounds, which, in the range of 70°–85° C., proves to be about 580 kcal/kg. As the $\Delta H$ of water evaporation at 100° C. is 540 kcal/kg, the result, in practice, is that the heat deriving from the decomposition of one kg of peroxides corresponds to the heat necessary for the evaporation of one kg of water.

The possible decomposition of 5% of peroxides at the top of the column would therefore cause the evaporation of the corresponding quantity of water. As the total volume of water present in the column is much higher than the quantity of peroxides, the system would always be able to absorb even significant decompositions of peroxides.

We can therefore assert that it is possible to carry out the distillation even with a normal steel column, as a limited decomposition of peroxides would cause the evaporation of a quantity of water which is in any case limited with respect to the total quantity of water concerned.

Operating at reduced pressure, with temperatures at the top of less than 100° C., the decomposition of the hydroperoxides will decrease in relation to the reduction in the residual pressure of the column.

At a pressure of 100 mmHg, a solution is distilled containing about 30% w/w of peroxides at a temperature of about 50° C. Operating at this temperature, for contact times of less than 30 minutes, the decomposition of the peroxides would be practically non-existing.

The following examples illustrate the invention.

EXAMPLE 1

An aqueous stream coming from the oxidation section of cumene to cumylhydroperoxide, containing methylhydroperoxide and cumylhydroperoxide in a total concentration of 0.6% w/w, is fed in continuous to a 15-plate Oldershaw column, with feeding at the 10th plate, and removal at the 15th plate.

The distillation is carried out at atmospheric pressure with a reflux ratio of 5:1.

With a withdrawal at the top of about 6% w/w of the quantity fed, there is the almost total, disappearance of the peroxides in the effluent at the bottom of the column and the COD value proves to be about ⅓ of the feeding value. The results of the test are shown in table 1.

EXAMPLE 2

Example 1 is repeated using a reflux ratio equal to 10:1 and removing at the top a quantity of 3.4% w/w of the feeding.

The results of the test, shown in table 3, indicate that the reduction in the withdrawal at the top does not cause a deterioration in the quality of the effluent at the bottom in terms of peroxide content and COD, obtaining in fact almost analogous values to those of Example 1.

EXAMPLE 3

Example 1 is repeated using a reflux ratio of 20:1 and removing at the top a quantity equal to 1.6% w/w of the feeding.

The results, shown in table 4, indicate peroxide contents and COD in the stream at the bottom of the column analogous to those in Example 1.

This proves, therefore, that even with very reduced withdrawals at the head, it is possible to almost completely eliminate the peroxides from the effluent stream at the bottom of the column, with a consequent reduction in the COD value to about ⅓ with respect to the value of the stream fed.

EXAMPLE 4

Example 2 is repeated operating at a pressure of 100 mmHg, with a withdrawal at the head of 1.5% w/w.

The temperature at the head is about 50° C., at which there is no decomposition of the hydroperoxides.

The results of the test, shown in table 2, indicate that, operating at reduced pressure, with the same number of steps in the column, a slightly less efficient separation is obtained than that obtained operating at a higher pressure, and both the peroxide content and the COD prove to be slightly greater in the stream at the bottom of the column compared to the streams obtained operating at atmospheric pressure.

TABLE 1

| Pressure (mm Hg): 760 | Reflux ratio: 5/1 | |
|---|---|---|
| | Feeding (g/h):190 | Drawing (g/h):11.55 | Effluent (g/h):178.5 |
| Peroxide content (% w/w) | 0.6 | 9.8 | 0.01 |
| COD content (mg O₂/l) | 16.150 | 184.000 | 5.500 |

TABLE 2

| Pressure (mm Hg): 100 | Reflux ratio: 10/1 | |
|---|---|---|
| | Feeding (g/h):368 | Drawing (g/h):5.4 | Effluent (g/h):178.5 |
| Peroxide content (% w/w) | 0.5 | 29.1 | 0.08 |
| COD content (mg O₂/l) | 15.800 | 581.000 | 7.500 |

TABLE 3

| Pressure (mm Hg): 760 | Reflux ratio: 10/1 | |
|---|---|---|
| | Feeding (g/h):187 | Drawing (g/h):6.4 | Effluent (g/h):180.6 |
| Peroxide content (% w/w) | 0.6 | 17.1 | 0.01 |
| COD content (mg $O_2$/l) | 16.350 | 331.000 | 5.100 |

TABLE 4

| Pressure (mm Hg): 760 | Reflux ratio: 20/1 | |
|---|---|---|
| | Feeding (g/h):360 | Drawing (g/h):5.8 | Effluent (g/h):354.2 |
| Peroxide content (% w/w) | 0.6 | 36.2 | 0.01 |
| COD content (mg $O_2$/l) | 15.800 | 654.000 | 5.400 |

The results set forth in Tables 1 to 4 thus show a reduction in the Chemical Oxygen Demand by about ½ to about ⅓. Specifically, in Tables 1, 3 and 4, the reduction of the Chemical Oxygen Demand is about ⅓, and in Table 2, the reduction of the Chemical Oxygen Demand is about ½.

We claim:

1. Process for the reduction of the Chemical Oxygen Demand by about ½ to about ⅓ of an aqueous stream containing methylhydroperoxide, cumylhydroperoxide and organic impurities, comprising subjecting said aqueous stream to column distillation and removing a stream from the top of the distillation column containing between 1 and 6% w/w of the peroxides in the aqueous stream fed thereto, wherein the distillation is carried out at a pressure which is less than or equal to 760 mmHg.

2. Process according to claim 1, wherein the organic impurities are at least one selected from the group consisting of phenol, cumene and alphamethylstyrene.

3. Process according to claim 2, wherein the methylhydroperoxide and cumylhydroperoxide are present in the aqueous stream in a total concentration of less than 2% w/w.

4. Process according to claim 3, wherein the methylhydroperoxide and cumylhydroperoxide are present in a total concentration of between 0.5 and 1% w/w.

5. Process according to claim 1, wherein the aqueous stream is obtained from an oxidation of cumene to cumylhydroperoxide in preparing phenol from cumene.

6. Process according to claim 1, wherein the stream removed from the top of the column is between 1 and 2% w/w of the aqueous stream fed thereto.

7. Process according to claim 1, wherein the stream removed from the top of the column contains from 10 to 50% w/w of total peroxides.

8. Process according to claim 7, wherein the stream removed from the top of the column contains from 30 to 40% w/w of total peroxides.

9. Process according to claim 1, wherein the distillation is carried out in a continuous manner.

10. Process according to claim 1, wherein the distillation is carried out in a column whose upper section and equipment at its head for withdrawal and reflux is internally lined with non-metallic material.

11. Process according to claim 10, wherein the non-metallic material is glass, polymeric or ceramic material.

* * * * *